United States Patent [19]

Watanabe et al.

[11] 4,247,608
[45] Jan. 27, 1981

[54] ELECTROLYTIC CELL OF HIGH VOLTAGE

[75] Inventors: Nobuatsu Watanabe, No. 136, Uguisu-dai, Nagaokakyo-shi, Kyoto; Kenichi Morigaki, Kobe, both of Japan

[73] Assignees: Nobuatsu Watanabe, Nagaokakyo; Applied Science Research Institute, Kyoto, both of Japan

[21] Appl. No.: 67,822

[22] Filed: Aug. 20, 1979

[30] Foreign Application Priority Data

Aug. 21, 1978 [JP] Japan .................................. 53-100911

[51] Int. Cl.³ .......................................... H01M 4/58
[52] U.S. Cl. .................................. 429/194; 429/218
[58] Field of Search ............................. 429/194, 218

[56] References Cited

U.S. PATENT DOCUMENTS

| | | | |
|---|---|---|---|
| 3,536,532 | 10/1970 | Watanabe et al. | 429/194 |
| 3,700,502 | 10/1972 | Watanabe et al. | 429/218 |
| 3,956,018 | 5/1976 | Kozawa | 429/218 |
| 4,166,888 | 9/1975 | Rao et al. | 429/218 |

*Primary Examiner*—Donald L. Walton
*Attorney, Agent, or Firm*—Armstrong, Nikaido, Marmelstein & Kubovcik

[57] ABSTRACT

An electrolytic cell comprising a negative electrode having as the active material a light metal and a positive electrode as the main active material a poly-dicarbon monofluoride represented by the formula $(C_2F)_n$ has been found to exhibit a high discharge voltage as compared with the conventional electrolytic cell of the type using as the active material of the positive electrode a polycarbon monofluoride represented by the formula $(CF)_n$ and also been found to be excellent in flatness of discharge voltage and shelf-life. The electrolytic cell of the present invention can be produced at low cost due to high yield of $(C_2F)_n$ in production, and is useful as the energy source of such devices as watch, clock, desk type computer, small type radio, etc.

16 Claims, 7 Drawing Figures

X-RAY DIFFRACTION POWDER PATTERNS OF PRODUCTS PREPARED AT VARIED REACTION TEMPERATURES

ELECTROLYTIC CELL OF HIGH VOLTAGE

This invention relates to an electrolytic cell. More specifically, the invention is concerned with an electrolytic cell of the type having as the negative electrode a light metal, such as an alkali metal or aluminum, and an electrolyte in which the negative electrode is not dissolved. The electrolytic cell of this invention is characterized in that the positive electrode has as an active material thereof poly-dicarbon monofluoride represented by the formula $(C_2F)_n$.

It is known that polycarbon monofluoride represented by the formula $(CF)_n$ in which the ratio of carbon to fluorine is 1 and n is an integer is obtained by reacting carbon material or graphite with fluorine at a temperature of about 410° C. to about 630° C. in an atmosphere of fluorine, a halogen fluoride or a mixture thereof or their mixture with an inert gas or air. It is also known that the structure of the above-mentioned polycarbon monofluoride is such that fluorine atoms introduced into interlayer spacings between lattice layers which are characteristic of graphite or carbon are covalently bonded to the carbon atoms by forming a pair of electrons from a valence electron of the fluorine atom and an excess valence electron of the carbon atoms. Polycarbon monofluoride $(CF)_n$ as described above is highly appreciated due to its peculiar properties in a wide variety of industrial fields for usages thereof as active materials in electrolytic cells, lubricants, anti-wetting, stain resistant and water and/or oil-repellent materials, etc. Especially, in the field of electrolytic cells, polycarbon monofluoride is known to be an active material which provides a primary cell of high energy density and long shelf life in which voltage drop due to discharge is scarcely observed for a long period of time. In this connection, however, it is to be noted that the electrolytic cell using as the active material a compound $(CE)_n$ has such a disadvantage that it exhibits a relatively low voltage.

The conventionally known polycarbon monofluoride $(CF)_n$ has further fatal drawbacks in the production thereof. Illustratively stated, the thermal decomposition temperature of $(CF)_n$ is extremely close to the temperature employed for the formation of the $(CF)_n$. For example, when petroleum coke (not graphitized by heat treatment) is employed as a carbon material and reacted with fluorine, the desired $(CF)_n$ is obtained by the reaction of at 400° C. for several hours but the so obtained $(CF)_n$ easily decomposes at 450° C. Whereas, when natural graphite is employed as a carbon material and reacted with fluorine, the desired $(CF)_n$ is obtained by the reaction of at 600° C. for 48 hours but the so obtained $(CF)_n$ easily decomposes at 610° C. Generally, the temperature difference between the formation temperature of $(CF)_n$ and the decomposition temperature is only about 10 to about 50° C. It should be further noted that both the formation reaction of $(CF)_n$ and the decomposition reaction thereof are exothermic. Hence, with the progress of formation of $(CF)_n$, the temperature of the reaction system is liable to rise and, at the same time, the low crystallinity $(CF)_n$ moiety partially formed is caused to decompose, whereby heat is further generated by such decomposition reaction to further elevate the temperature of the reaction system. As a result of this, the decomposition of the formed $(CF)_n$ is accelerated, and occasionally the temperature of the whole reaction system is caused to rise to above the decomposition temperature of the formed $(CF)_n$, whereby all of the formed $(CF)_n$ is caused to completely decompose to amorphous carbon and gaseous fluorocarbons such as $CF_4$. Consequently, the yield of $(CF)_n$ is extremely low. For this reason, in order to obtain $(CF)_n$ in an improved yield, there have been made such attempts that the temperature of the reaction system is always adjusted to the temperature of formation of $(CF)_n$ and that the reaction is effected in multiple steps. However, the former encounters difficulty in controlling the temperature of the reaction system, and the latter leads to complicatedness of the process. Neither of them is practical. Accordingly, at present, $(CF)_n$ is produced in a yield as low as only several percent in relation to the fluorine employed and several ten percent in relation to the carbon material employed.

As described above, the production of $(CF)_n$ is inevitably and disadvantageously accompanied by its liability to decomposition. Therefore, when the reaction of a carbon material with fluorine is effected in a closed system, the fluorine partial pressure in the reaction interface regions is reduced due to presence of gaseous fluorocarbons formed by the decomposition of the formed $(CF)_n$, leading to extreme reduction of the rate of formation of $(CF)_n$ whereby there is hardly produced a compound $(CF)_n$. For this reason, there is usually employed a so-called fluorine flow method for the production of $(CF)_n$. However, even with the flow method, the yield of $(CF)_n$ in relation to the fluorine employed is extremely low and, in addition, the unreacted fluorine is flowed out and usually burnt, leading to large loss of expensive fluorine. Further, since the reaction for the production of $(CF)_n$ is generally conducted at relatively high temperatures, for example, about 550° to about 630° C. for shortening the reaction time, corrosion of the reaction vessel by a high temperature fluorine gas is large and cannot be neglected from the viewpoint of chemical engineering.

As fully understood from the above, also due to the difficulties in the production thereof, the practical use of polycarbon monofluoride $(CF)_n$ as the cathode material in electrolytic cells is extremely limited.

We have previously proposed a completely novel compound poly-dicarbon monofluoride $(C_2F)_n$ having properties comparable to those of polycarbon monofluoride $(CF)_n$. In this connection, it should be noted that a novel poly-dicarbon monofluoride $(C_2F)_n$ can surprisingly be obtained in a yield as high as 100% as opposed to the polycarbon monofluoride which can be obtained in extremely low yield.

The novel compound poly-dicarbon monofluoride represented by the formula $(C_2F)_n$ is as low as about 44.2% by weight with respect to theoretical fluorine content as compared with the conventional polycarbon monofluoride $(CF)_n$ having a theoretical fluorine content of about 61.3% by weight. Notwithstanding, poly-dicarbon monofluoride $(C_2F)_n$ unexpectedly exhibits high discharge voltage in use thereof as the active material in electrolytic cells as compared with polycarbon monofluoride $(CF)_n$. The present invention has been made, based on this novel finding.

Accordingly, it is one object of the present invention to provide an electrolytic cell of the type using a fluorinated carbon material as the positive electrode, which exhibits high voltage and good discharge characteristics with respect to, for example, flatness of discharge voltage, high density energy and freedom of leakage.

It is another object of the present invention to provide an electrolytic cell of the kind described above, which can be manufactured at low cost.

The foregoing and other objects, features and advantages of the present invention will be apparent to those skilled in the art from the following detailed description taken in connection with the accompanying drawings in which.

According to the present invention, there is provided an electrolytic cell comprising a negative electrode having as the active material a light metal, an electrolyte and a positive electrode having as the main active material a poly-dicarbon monofluoride represented by the formula $(C_2F)_n$ wherein n is an integer and having a crystalline structure in which a layer structure is stacked with an interlayer spacing of about 9.0 Å to form a packing structure, said crystalline structure exhibiting a peak at about 10° in terms of an angle of 2θ in the X-ray diffraction powder pattern.

Figure 1:
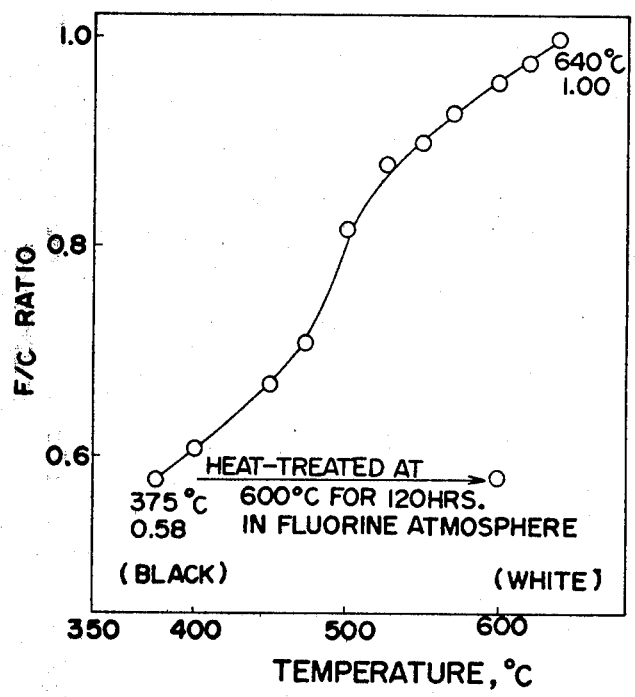
FIG. 1 is a graph showing the relationships between the reaction temperatures and the F/C ratios of the products obtained by the reaction between natural graphite and fluorine.
Figure 2:
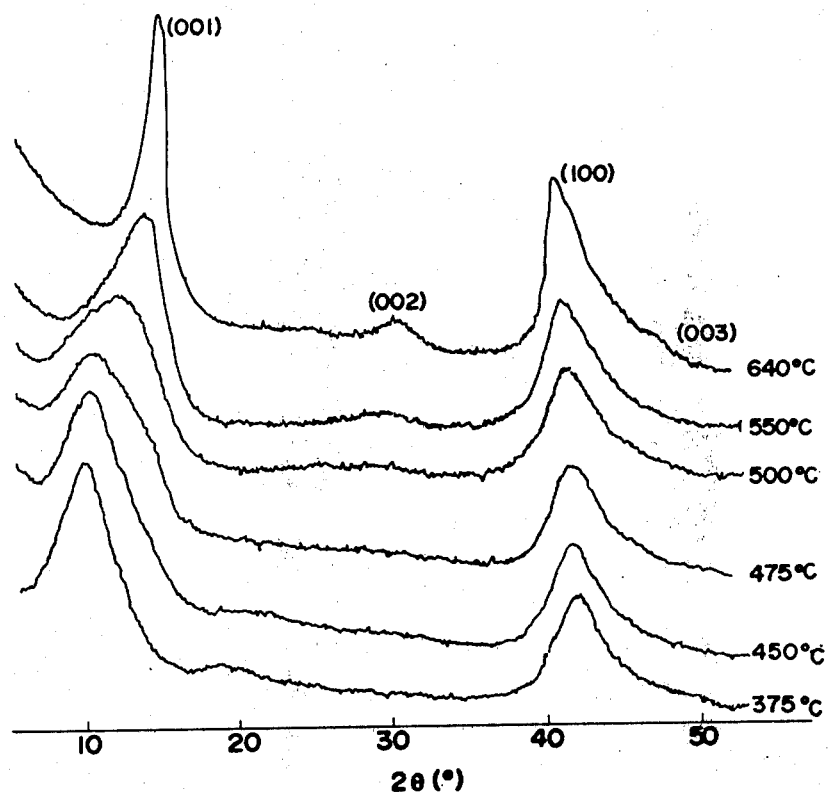
FIG. 2 shows the X-ray diffraction powder patterns of the fluorinated carbon products prepared at varied reaction temperatures.
Figure 3:
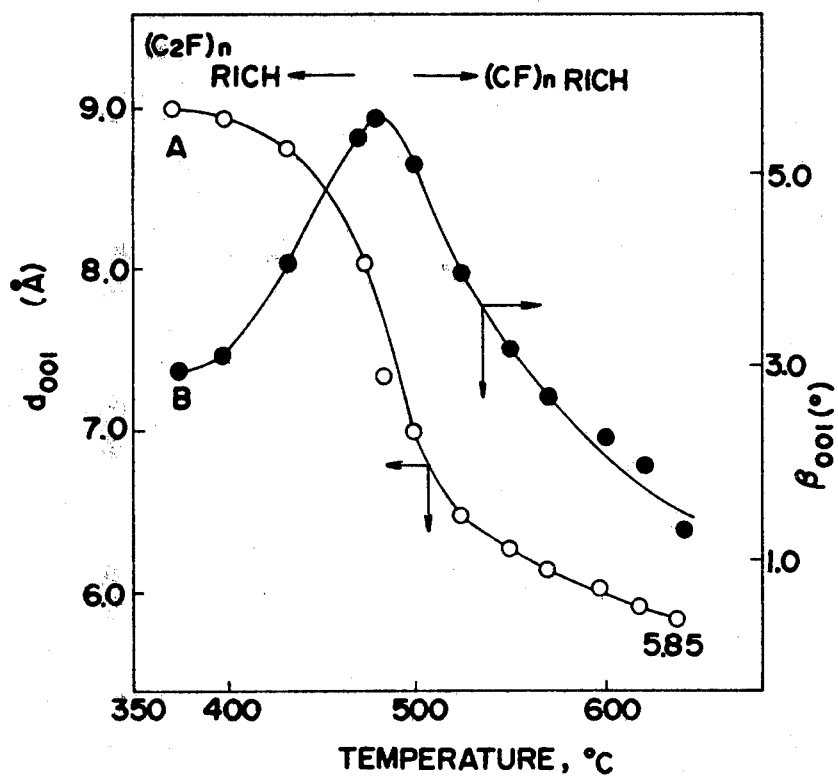
FIG. 3 is a graph in which based on the X-ray diffraction powder patterns, interlayer spacing ($d_{001}$) and half widths ($\beta_{001}$) of the fluorinated products are plotted against the reaction temperatures.

Referring now to FIGS. 1 to 3, explanation will be given on novel poly-dicarbon monofluoride $(C_2F)_n$ and process for the preparation thereof.

In FIG. 1, there is illustrated a graph obtained by plotting F/C ratios of the products prepared by reacting natural graphite (produced in Madagascar and having a purity of more than 99%) having a sieve size of 200 to 250 mesh (Tyler) with fluorine under an $F_2$ pressure of 200 mmHg against the reaction temperatures employed. The following Table 1 corresponds to FIG. 1.

TABLE 1

Relationships between the reaction temperatures
and F/C ratios of the products (empirical formulae)
(Natural graphite, 200 to 250 mesh; $F_2$, 200 mmHg)

| Temperature, °C. | Reaction Time | | Empirical Formula |
|---|---|---|---|
| 375 | 120 | hrs. | $CF_{0.58}$ |
| 400 | 50 | hrs. | $CF_{0.61}$ |
| 450 | 10 | hrs. | $CF_{0.67}$ |
| 450 | 70 | hrs. | $CF_{0.67}$ |
| 475 | 5 | hrs. | $CF_{0.71}$ |
| 475 | 50 | hrs. | $CF_{0.72}$ |
| 500 | 150 | min. | $CF_{0.82}$ |
| 525 | 100 | min. | $CF_{0.88}$ |
| 550 | 50 | min. | $CF_{0.90}$ |
| 570 | 40 | min. | $CF_{0.93}$ |
| 570 | 120 | hrs. | $CF_{0.93}$ |
| 600 | 20 | min. | $CF_{0.96}$ |
| 600 | 140 | hrs. | $CF_{0.97}$ |

TABLE 1-continued

Relationships between the reaction temperatures
and F/C ratios of the products (empirical formulae)
(Natural graphite, 200 to 250 mesh; $F_2$, 200 mmHg)

| Temperature, °C. | Reaction Time | | Empirical Formula |
|---|---|---|---|
| 640 | 5 | hrs. | $CF_{1.00}$ |

As apparent from Table 1 and FIG. 1, the ratio of F/C gets closer to 1 according to elevation of the reaction temperature. The product obtained at a relatively low temperature, for example, of 375° C. has an F/C ratio of 0.58 (namely, $CF_{0.58}$) and a black color. In this connection, it should be noted that once the product having such an F/C ratio of 0.58 is formed, the F/C ratio unexpectedly no longer changes even if the product is further heat-treated at 600° C. for a period of time as long as 120 hrs. in a fluorine atmosphere. Only the color of the product changes from black to white.

In FIG. 2, there are shown X-ray diffraction powder patterns of the products obtained by the experiments for making Table 1 and FIG. 1. In FIG. 3, based on the X-ray diffraction powder patterns of FIG. 2, interlayer spacings ($d_{001}$) and half width ($\beta_{001}$) are plotted against the reaction temperatures. As clear from FIGS. 2 and 3, the position of the peak due to the diffraction (001) is shifted to the side of small angle of diffraction and the half width also changes according to lowering of the reaction temperature. The interlayer spacing of the product obtained by the reaction at 640° C. is 5.85 Å and corresponds to that of $(CF)_n'$, while the interlayer spacing of the product obtained by the reaction at 375° C. is 9.0 Å. The products obtained by the reactions at the intermediate temperatures have varied interlayer spacings intermediate the range of 5.85 to 9.0 Å. The half width of the diffraction (001) increases with elevation of the reaction temperature, shows maximum at a reaction temperature of about 480° C. and then decreases with further elevation of the reaction temperature. In the regions intermediate the reaction temperature range of 375° C. to 640° C., the formed products consist essentially of $C_2F$ stoichiometry and CF stoichiometry. When the (001) diffraction lines of the products obtained by the reactions at temperatures intermediate the range of 375° C. to 640° C. are corrected using a Lorentz's deviation factor, it becomes apparent that the respective diffraction lines consist of the diffraction line of $(C_2F)_n$ having a peak at about 10°(2θ) and that of $(CF)_n$ having a peak at 13.5°(2θ).

The data of FIGS. 1 to 3 clearly substantiates the formation a novel chemical compound poly-dicarbon monofluoride represented by the formula $(C_2F)_n$ and having a crystalline structure in which a layer structure is stacked with an interlayer spacing of about 9.0 Å to form a packing structure, said crystalline structure exhibiting a peak at about 10° in terms of an angle of 2θ in the X-ray diffraction powder pattern. The specific gravity of $(C_2F)_n$ is about 2.8, whereas that of $(CF)_n$ is about 2.7.

A poly-dicarbon monofluoride $(C_2F)_n$ may be prepared by reacting a particulate carbon material having Franklin's P-value of about 0 to about 0.6 with fluorine at a temperature of 300° to 500° C. until complete fluorination of the particulate carbon material is accomplished (reference may be made to reissue application of U.S. Pat. No. 4,139,474).

In the fluorination reaction of a particulate carbon material, the reaction temperature range of from 300° to 500° C. is most important and critical for obtaining polydicarbon monofluoride, namely $(C_2F)_n$. When the reaction temperature is lower than 300° C., the reaction does not proceed. On the other hand, if the reaction temperature is higher than 500° C., formation of $(CF)_n$ preferentially proceeds, so that the amount of $(C_2F)_n$ formed is small. In addition, with a reaction temperature of higher than 500° C., the formed product is liable to easily decompose, leading to considerable decrease in yield.

The crystallinity of a particulate carbon material to be employed as a raw material also is critical for obtaining $(C_2F)_n$. The crystallinity of a carbon material can be expressed in terms of Franklin's P-value. The Franklin's P-value is defined by the formula $$d_{(002)} = 3.440 - 0.086(1-P^2)$$

wherein $d_{(002)}$ is an interlayer spacing of (002) [R. E. Franklin: Proc. Roy. Soc. A 209, 196 (1951)]. For obtaining $(C_2F)_n$, the Franklin's P-value of the carbon material should be in the range of from 0 to 0.6. The carbon material having a Franklin's P-value of 0 is completely crystalline, and the representative example is natural graphite from Madagascar ores. When the carbon material having a Franklin's P-value of more than 0.6, the formation reaction of $(CF)_n$ rapidly proceeds and there is formed no $(C_2F)_n$. As stated above, the natural graphite may most preferably be employed for obtaining $(C_2F)_n$. Besides, there may also preferably be employed graphitized carbon materials having a Franklin's P-value of 0.6 or less, for example, petroleum cokes which have been heat-treated at about 2,000° to about 3,000° C., for about 10 to about 120 minutes in a graphitizing furnace. In this connection, it is noted that when such graphitized carbon materials as heat-treated petroleum cokes are used, the products tend to have a relatively much amount of peripheral $CF_2$ groups and $CF_3$ groups since the particle size of petroleum coke is relatively small.

The reaction period of time is not critical. For obtaining $(C_2F)_n$ to be employed in the present invention, it is essential that the reaction of a particulate carbon material with fluorine is conducted until complete fluorination of the particulate carbon material is accomplished, that is, until further heating of the product in an atmosphere of fluorine gas does not cause increase in the fluorine content of the product any more. The time required for the complete fluorination of a particulate carbon material varies depending on the reaction temperature, crystallinity of a carbon material, particle size of a carbon material and pressure of a fluorine atmosphere, but, generally, may be 10 minutes to 150 hours. If fluorination of the particulate carbon material is not complete, the products naturally contain unreacted carbon material. In this connection, it is noted that in view of the reaction temperatures and reaction periods of time employed in U.S. Pat. No. 3,536,532, the products $(CF_x)_n$ wherein $x<1.0$ disclosed therein are not stoichiometrical but only empirical and contain unreacted carbon material.

The particle size of a particulate carbon material also is not critical. However, if the particle size is too large, extremely long reaction time is needed for complete fluorination of the particulate carbon material. While, if the particle size is too small, the $(CF)_n$ formation reaction tends to preferentially proceed, resulting in decrease of the $(C_2F)_n$ content of the product. In general, the article size of particulate carbon material may preferably be in the range of from 1 to $150\frac{3}{4}$, more preferably in the range of 20 to $100\mu$ and most preferably in the range of 30 to $80\mu$.

The pressure of fluorine gas also is not critical. Generally, it can be said that although the higher the fluorine pressure, the larger the $(C_2F)_n$ content of the product is, a reaction vessel resistible to a very high pressure fluorine atmosphere at temperatures employed is not available. Usually, as a material for a reaction vessel, nickel or such a nickel alloy as Monel metal is most suitably used. For this reason, the range of fluorine gas pressure is advantageously 50 mmHg to 1.5 atm.

The optimum temperature conditions for obtaining $(C_2F)_n$ to be employed in the present invention slighly varies according to crystallinity of the carbon material to be employed. When the Franklin's P-value is 0 to about 0.10, the optimum reaction temperature is 350° to 500° C. When the Franklin's P-value is about 0.11 to 0.45, the optimum reaction temperature is 320° to 450° C. When the Franklin's P-value is about 0.46 to 0.60, the optimum reaction temperature is 300° to 420° C. As aforementioned, the reaction time varies depending on the reaction temperature etc. Generally, for example, when the reaction temperature is about 350° C., the reaction time may preferably be in the range of from 50 to 150 hrs. When the reaction is conducted at about 500° C., the reaction time may suitably be 10 to 100 minutes.

In order to selectively obtain a poly-dicarbon monofluoride of the formula $(C_2F)_n$ only, the reaction temperature is further limited and varies according to the Franklin's P-value of the carbon material to be employed. When the Franklin's P-value is 0 to about 0.10, the reaction temperature may preferably be 350° to 400° C. When the Franklin's P-value is about 0.11 to about 0.45, the reaction temperature may preferably be 320° to 360° C. When the Franklin's P-value is about 0.46 to about 0.6, the reaction temperature may preferably be 300° to 340° C.

According to the present invention, as the active material of the positive electrode, there may also be employed a $(C_2F)$-rich polycarbon fluoride composition consisting essentially of $C_2F$ stoichiometry and $CF$ stoichiometry, the content of $C_2F$ stoichiometry being more than 50 mole %, based on the composition. Previously, we have unexpectedly found that the yield of the CF stoichiometry moiety of the $(C_2F)_n$-rich polycarbon fluoride composition obtained by the reaction of at a temperature of 500° C. or less is also 100% with respect to not only the carbon material but also the fluoride. The decomposition of the product does not occur at all.

In the electrolytic cell according to the present invention, as stated before, there is employed a positive electrode having as the main active material a poly-dicarbon monofluoride represented by the formula $(C_2F)_n$. Preparation of such a positive electrode may be prepared as follows. For example, the powder of poly-dicarbon monofluoride $(C_2F)_n$ obtained by reacting natural graphite with fluorine at 375° C. under a fluorine pressure of 760 mmHg for 120 hours was mixed with an electrically conductive agent such as a carbon powder, acetylene black or the like and a binder such as a powder of polyethylene or a fluoropolymer, e.g., polytetrafluoroethylene, or an expanded graphite to prepare an active material mixture for a positive electrode. This mixture can be easily molded into a predetermined shape to form a positive electrode. The amount of a carbon black or acetylene black as the electrically conductive agent may be employed in an amount of about 3 to 20% by weight, preferably about 8 to 15% by weight based on the active material mixture. The amount of the binder may be employed in an amount of about 1 to 10% by weight based on the active material mixture. An expanded graphite can serve not only as a binder but also as an electrically conductive agent, and a suitable amount of an expanded graphite to be used for attaining both the functions is about 25 to 75% by weight based on the active material mixture. Needless to say, the larger the $(C_2F)_n$ content of the active material mixture, the better the electrochemical performance of a positive electrode produced from said mixture. However, it is possible to use a mixture containing about 25% by weight of $(C_2F)_n$ for providing a positive electrode which sufficiently performs in the intended use of an electrolytic cell of the present invention. In this connection, it is to be noted that, since poly-dicarbon monofluoride $(C_2F)_n$ is more electrically conductive than polycarbon monofluoride $(CF)_n$, the amount of the electrically conductive agent incorporated into the mixture may be smaller in the case of use of the $(C_2F)_n$ than that in the case of use of the $(CF)_n$, thus enabling the $(C_2F)_n$ content of the mixture for a positive electrode to be advantageously increased. The positive electrode is produced simply by molding the mixture, preferably about a metallic reinforcing member comprising a central screen of nickel. Said reinforcing member may alternatively be any metal screen or grid, a perforated plate or lath plate or fibrous carbon.

A negative electrode to be used in combination with the above-mentioned positive electrode having as the main active material a poly-dicarbon monofluoride $(C_2F)_n$ may be made of a light metal or light metal alloy, examples of which include alkali metals such as lithium and sodium; alkaline earth metals such as magnesium and calcium; aluminum; and alloys containing as the main component any of the above-mentioned metals.

An electrolyte to be used in the electrolytic cell of this invention depends on the kind of negative electrode metal and is usually of a non-aqueous system. The concentration of an electrolyte is not critical and may be chosen so that it gives a high electrical conductivity. As the solute of the electrolyte, there may be used various compounds, for example, $LiClO_4$, $KPF_6$, $LiAlCl_4$ and the like. As the non-aqueous solvent of the electrolyte, there may be used various compounds, for example, propylene carbonate, ethylene carbonate, dimethylformamide, tetrahydrofuran, dimethyl sulfoxide, dimethyl sulfite, 1,2-dimethyoxyethane, methyl formate, acetonitrile and the like.

The electrolytic cell of the present invention comprising a negative electrode having as the active material a light metal, an electrolyte and a positive electrode having as the main active material a poly-dicarbon monofluoride represented by the formula $(C_2F)_n$ is excellent in energy density, utilization of active material, flatness of discharge voltage and shelf life.

Further, it is particularly to be noted that the electrolytic cell using $(C_2F)_n$ as the active material of the positive electrode according to the present invention exhibits a voltage higher than that of the electric cell using $(CF)_n$ as the active material of the positive electrode. The electrolytic cell of this type is advantageously used in such devices as needs a higher voltage rather than a higher electric power. Such devices include, for example, a watch, a clock, a desk type computer, a small type radio and the like which generally operate at a current density of only not more than about 0.1 mA/cm². The cell of the present invention surprisingly provides high discharge voltage in spite of the lower fluorine content of the $(C_2F)_n$ than the fluorine content of the $(CF)_n$.

Furthermore, the electrolytic cell of the present invention has an advantage that it can be produced at very low cost because, due to the production yield thereof surprisingly as high as 100%, a poly-dicarbon monofluoride $(C_2F)_n$ is very cheap as compared with the conventional polycarbon monofluoride $(CF)_n$ whose production yield is as low as only a few percent. Thus, the electrolytic cell of the present invention can provide a very high industrial value.

Illustrative features and advantages of the invention will appear from the following description of embodiments of the invention, given only by way of example.

An electrolytic cell was produced as follows.

Propylene carbonate (hereinafter often referred to "PC") to be used for the preparation of an electrolytic solution was prepared by subjecting a commercially available PC to dehydration and purification by vacuum distillation at a temperature below 100° C. under a pressure of 10 mmHg, and stored in a desiccator where the propylene carbonate was dried on a 4 A molecular sieve (a sieve having a sieve size of 4 Å and manufactured by Du Pont Co., U.S.A.). Lithium perchlorate ($LiClO_4$) to be used as the solute of an electrolytic solution was prepared by a method in which a commercially available $LiClO_4$ was kept over phosphorus pentoxide and vacuum-dried for about one week. A solution of 1 M lithium perchlorate ($LiClO_4$) in one liter of propylene carbonate (PC) was prepared, and placed in a desiccator where the solution was dried on a 4A molecular sieve and stored in a dry box. A poly-dicarbon monofluoride $(C_2F)_n$ as the active material was produced by reacting particulate natural graphite (200 mesh, Tyler) from Madagascar ore with fluorine at 375° C. under a fluorine pressure of 760 mmHg for 144 hours. 75 times expanded graphite (manufactured by Chuo Kasei K.K., Japan) produced by subjecting natural graphite to oxidation with fuming nitric acid, washing with water, separation by centrifugation and rapid heating at about 1,000° C. was used as a material serving as both an electrically conductive agent and a binder for making it easy to analyze the performance of the $(C_2F)_n$ active material. The $(C_2F)_n$ was mixed with the expanded graphite in a weight ratio of 1:1, and the mixture was compression-molded under a pressure of about 4,600 Kg/cm² for 1 minute to obtain a pellet of 9 mm and 1 mm in diameter and thickness, respectively. Around the $(C_2F)_n$ pellet was wound Carboron (trade name of carbon fiber manufactured by Nihon Carbon K.K., Japan) in a thickness of about 1 mm. The terminal portion of carbon fiber was inserted through a polyethylene tube to give an electrical connection. The above-prepared $(C_2F)_n$ electrode element was coated with polyethylene using on electric iron, leaving one-side surface thereof exposed, thereby to provide a $(C_2F)_n$ positive electrode. Lithium pellets cut off from a lithium block were used as the negative electrode and the reference electrode. The cell body was made of Polyflon (trade mark of a polyfluoroethylene type resin manufactured and sold by Daikin Kogyo K.K., Japan). The negative electrode and the positive electrode were disposed at a distance of 10 mm therebetween. The $(C_2F)_n$ positive electrode was securely inserted in a first concaved portion on the inner wall of the cell body to hold the same therein. The lithium negative electrode (100 mm × 35 mm) was given electrical connection by means of a nickel net and securely inserted in a second concaved portion formed opposite to the first concaved portion to hold the same therein. The lithium reference electrode was given electrical connection by means of a platinum wire. The respective lead fiber and wire were insulated with polyethylene as mentioned above.

For comparison, another electrolytic cell was produced by using $(CF)_n$ as the active material in the same manner as described above, except that $(CF)_n$ was employed in place of $(C_2F)_n$. The $(CF)_n$ active material was produced by reacting natural graphite (200 mesh, Tyler) from Madagascar ore with fluorine at 600° C. under a fluorine pressure of 100 mmHg for 8 hours.

Potentiostatic and Galvanostatic polarizations were recorded on a recorder Model 3056 (manufactured and sold by Yokogawa Denki K.K., Japan) by using a potentiostat Model NP-G1000E (manufactured and sold by Nichia Keiki K.K., Japan). In measuring voltage, an OP amplifier (operational amplifier) of having an internal impedance of $10^{14}\Omega$ was used for enabling the iR drop to be neglected. Potential scanning was carried out at a scanning rate of 120 sec/volt by using an automatic potential scanning apparatus Model PTC-5A (manufactured and sold by Hokuto Denko K.K., Japan) which was connected to a potentiostat, to record a potential-current relationship on an X-Y recorder Model F-3E (manufactured and sold by Riken Denshi K.K., Japan). All the measurements were carried out by keeping the electrolytic cell system in a dry box filled with a 30° C. argon gas.

1. Open Circuit Voltage

Figure 4:
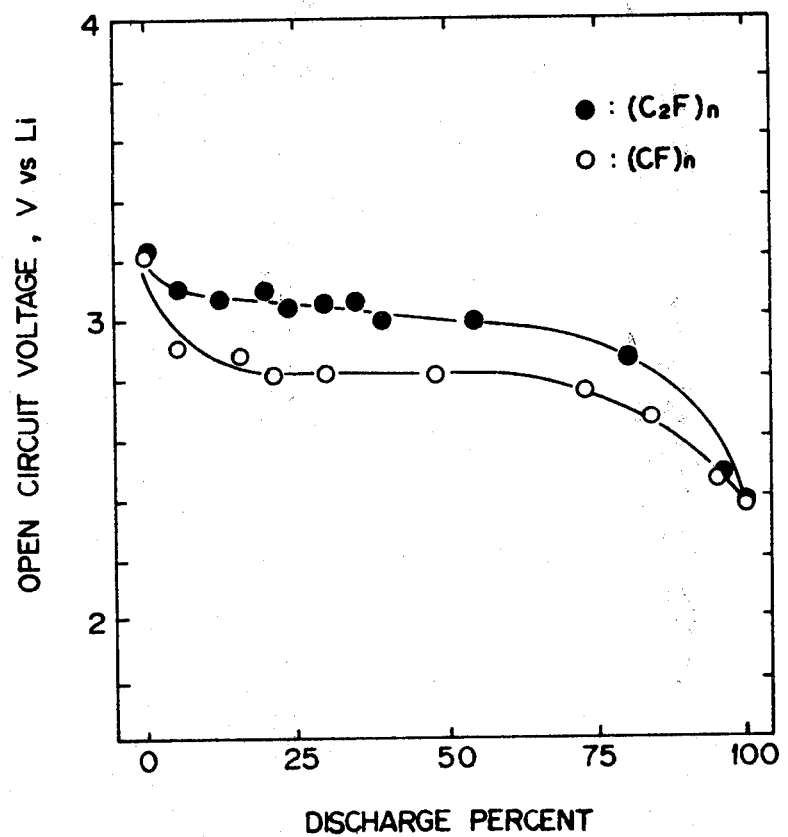
FIG. 4 is a graph showing the respective relationships, with respect to $(CF)_n$ and $(C_2F)_n$ electrodes, between open circuit voltage and discharge percent.

Referring to FIG. 4, there is shown a graph showing the respective relationships, with respect to $(CF)_n$ and $(C_2F)_n$ electrodes, between open circuit voltage and discharge percent. Measurements were done using electrolytic cells respectively having $(CF)_n$ and $(C_2F)_n$ electrodes in 1 M $LiClO_4$-PC at 30° C. In the graph, the data of $(CF)_n$ and $(C_2F)_n$ electrodes are shown by open circles and filled circles, respectively. With respect to the $(CF)_n$ positive electrode, the average initial open circuit voltage was 3.20 volts. With respect to the $(C_2F)_n$ positive electrode, the initial open circuit voltage was 3.22 volts. With respect to the $(CF)_n$ positive electrode, the discharge was carried out at a constant-current of 2 milliamperes, while, with respect to the $(C_2F)_n$ positive electrode, the discharge was carried out at a constant-current of 1 milliampere. Dey et al. reported in J. Electrochem. Soc., 117, 222 (1970) that the electrochemical reduction, on a graphite electrode, of propylene carbonate in a 1 M lithium perchlorate-propylene carbonate system into propylene and carbonate ions starts to occur at below 1 volt vs. Li and proceeds stably at about 0.6 volt, and therefore the discharge, in this experiment, was regarded as being completed when the discharge voltage reached 1 volt vs. Li. The respective open circuit voltages were values measured every 2 hours after termination of the polarization. With respect to the $(CF)_n$ positive electrode and the $(C_2F)_n$ positive electrode, the respective open circuit voltages decreased rapidly by the initial discharge and, thereafter, became substantially constant at certain values, which were around 2.8 volts vs. Li for the $(CF)_n$ positive electrode and around 3 volts vs. Li for the $(C_2F)_n$ positive electrode. The open circuit voltage after completion of the discharge was 2.4 volts vs. Li for both of the $(CF)_n$ positive electrode and the $(C_2F)_n$ positive electrode.

2. Potential Scanning Curve

Figure 5:
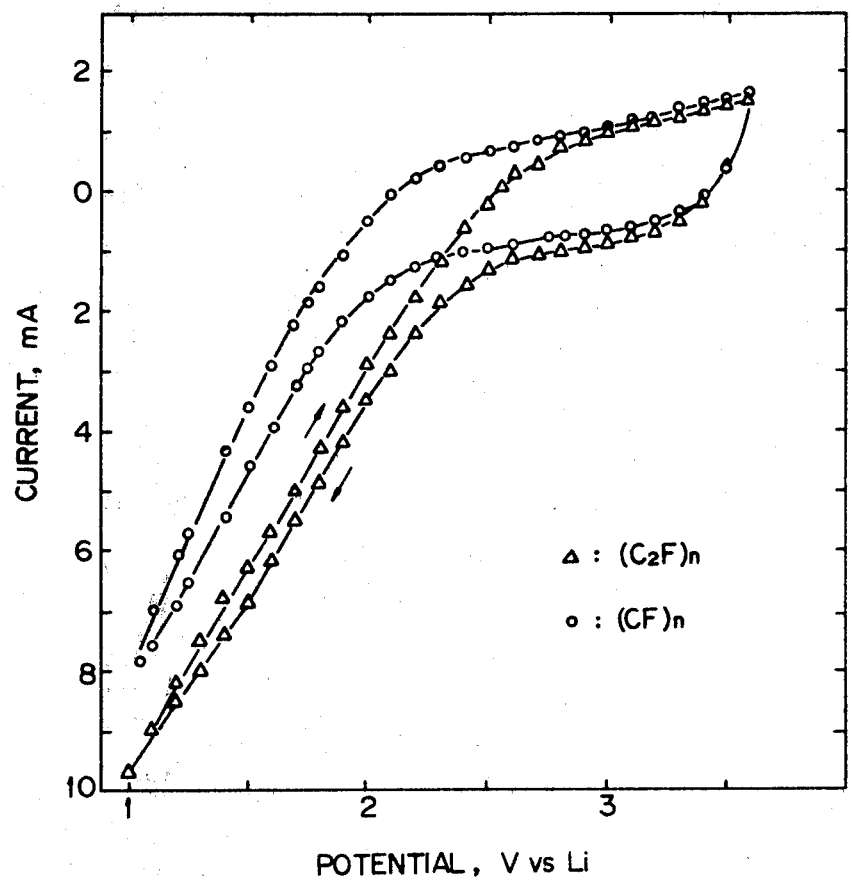
FIG. 5 shows potential scanning curves respectively with respect to $(CF)_n$ and $(C_2F)_n$ electrodes.

Referring to FIG. 5, there is shown potential scanning curves respectively with respect to $(CF)_n$ and $(C_2F)_n$ electrodes in 1 M $LiClO_4$-PC. The potential scanning was conducted at a rate of 120 sec/volt. In the graph, the data of $(CF)_n$ and $(C_2F)_n$ electrodes are shown by circles and triangles, respectively. The electrode reaction of fluorinated graphite was different in behavior between the low current region and the high current region. A marked difference in behavior was observed between both sides of about 2.2 volts vs. Li (overvoltage: about 1.2 volts) as the boundary for the $(CF)_n$ positive electrode and between both sides of about 2.5 volts vs. Li (overvoltage: about 0.9 volts) as the boundary for the $(C_2F)_n$ positive electrode. The current was substantially constant in the low current region because the discharge products produced by the diffusion of $Li^+$ ions into the positive electrode forms a resistant layer. The overvoltage increased in the high current region because the $Li^+$ ions moved across the resistant layer. The $(C_2F)_n$ positive electrode gave a low overvoltage as compared with the $(CF)_n$ positive electrode. Particularly in the high current region, with the $(C_2F)_n$ positive electrode, the current was observed to be 1.5 times as high as that with the $(CF)_n$ positive electrode.

3. Potential-Time Characteristics

Figure 6:
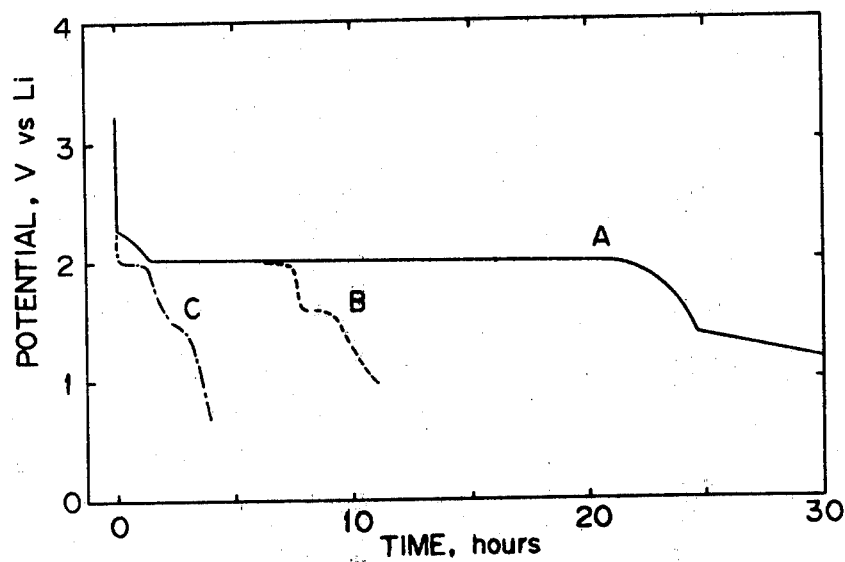
FIG. 6 shows galvanostatic discharge curves of a $(CF)_n$ electrode at varied current densities.
Figure 7:
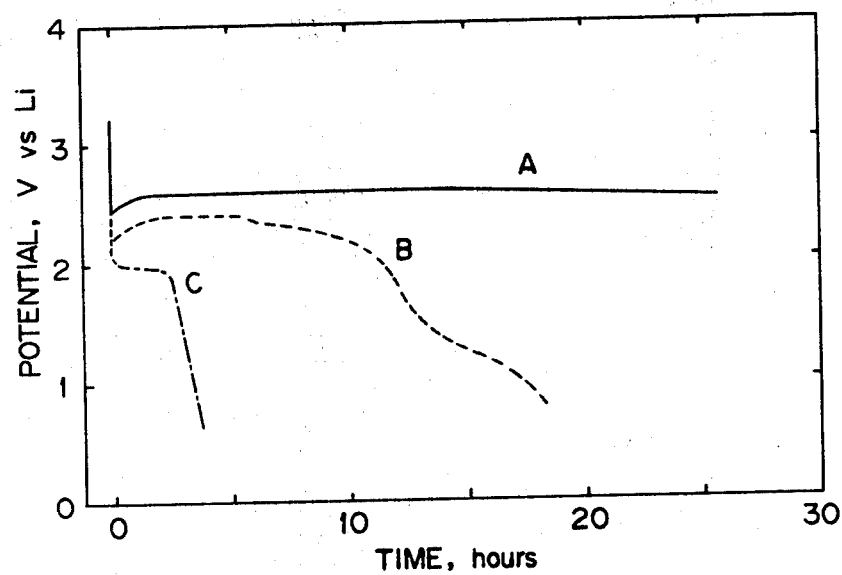
FIG. 7 shows galvanostatic discharge curves of a $(C_2F)_n$ electrode at varied current densities.

Referring to FIGS. 6 and 7, there are shown galvanostatic discharge curves of a $(CF)_n$ electrode at varied current densities and galvanostatic discharge curves of a $(C_2F)_n$ electrode at varied current densities, respectively. In FIG. 6, the curves A, B and C were obtained by the discharges at 1 milliampere (1.57 mA/cm$^2$), 2 milliamperes (3.14 mA/cm$^2$) and 4 milliamperes (6.29 mA/cm$^2$), respectively. In FIG. 7, the curves A, B and C were obtained by the discharges at 0.5 milliampere (0.78 mA/cm$^2$), 1 milliampere (1.57 mA/cm$^2$) and 2 milliamperes (3.14 mA/cm$^2$), respectively. Measurements were done using electric cells having the respective $(CF)_n$ and $(C_2F)_n$ electrodes in 1 M $LiClO_4$-PC at 30° C.

With respect to the $(CF)_n$ positive electrode, the discharge voltage became substantially constant at about 2 volts vs. Li. As can be seen in FIG. 6, however, the increase in current density led to the large decrease in capacity. This is believed to be attributed to the lagging diffusion of $Li^+$ ions into the interlayer spacings of the $(CF)_n$ because of the increase in resistance caused by the discharge products produced in the course of discharge. This is so because the voltage stayed substantially constant at about 1.5 volts after the voltage drop from 2 volts and, thereafter, decreased gradually as the discharge was further continued.

As can be seen in FIG. 7, the $(C_2F)_n$ positive electrode gave a behavior somewhat similar to that given by the $(CF)_n$ positive electrode. However, the discharge voltage with the $(C_2F)_n$ positive electrode stayed substantially constant at a higher level than the level given by the $(CF)_n$ positive electrode when the polarization of the $(C_2F)_n$ positive electrode proceeded to substantially the same extent as that of the $(CF)_n$ positive electrode polarization. For example, in the case of the constant-current discharge at 1 milliampere, the $(C_2F)_n$ positive electrode gave a discharge voltage of 2.4 volts vs. Li which was higher than that given by the $(CF)_n$ positive electrode, and gave an overvoltage about 0.4 volt lower than that given by the (CF)$_n$ positive electrode.

In some experiments or embodiments as given above, the different discharge conditions were employed between (CF)$_n$ and (C$_2$F)$_n$ in view of the fluorine content of (C$_2$F)$_n$ which is a half, in mole, that of (CF)$_n$. However, as will be well understood from the results shown in FIGS. 4 to 7, the actual use conditions in which the discharge current is only less than 0.1 mA, sometimes only 0.01–0.03 mA, importance of voltage rather than electric power, etc., it is apparent that an electrolytic cell using (C$_2$F)$_n$ as the active material has superior in many points to the conventional electrolytic cell using (CF)$_n$ as the active material. Further, it is noted that, due to a relatively high electric conductivity and a lost cost of material, the (C$_2$F)$_n$ content of the positive electrode can be easily increased so that the desired level of performance of electrolytic cell may be obtained with respect to capacity also.

What is claimed is:

1. An electrolytic cell comprising a negative electrode having as the active material a light metal, an electrolyte and a positive electrode having as the main active material a poly-dicarbon monofluoride represented by the formula (C$_2$F)$_n$ wherein n is an integer and having a crystalline structure in which a layer structure is stacked with an interlayer spacing of about 9.0 Å to form a packing structure, said crystalline structure exhibiting a peak at about 10° in terms of an angle of 2θ in the X-ray diffraction powder pattern.

2. An electrolytic cell according to claim 1, wherein said main active material of the positive electrode is a polycarbon fluoride composition consisting essentially of C$_2$F stoichiometry and CF stoichiometry, the content of C$_2$F stoichiometry being more than 50 mole %, based on the composition.

3. An electrolytic cell according to any of claims 1 and 2, wherein the active material of the negative electrode is an alkali metal.

4. An electrolytic cell according to claim 3, wherein the alkali metal is lithium.

5. An electrolytic cell according to any of claims 1 or 2, wherein the electrolyte is non-aqueous.

6. An electrolytic cell according to any of claims 1 or 2, wherein the positive electrode further includes a binder.

7. An electrolytic cell according to any of claims 1 or 2, wherein the positive electrode further includes an electrically conductive agent.

8. An electrolytic cell as in any of claims 1 or 2, wherein the active material of the negative electrodie is an alkali metal, and wherein the electrolyte is non-aqueous.

9. An electrolytic cell as in any of claims 1 or 2, wherein the active material of the negative electrode is the alkali metal lithium, and wherein the electrolyte is non-aqueous.

10. An electrolytic cell as in any of claims 1 or 2, wherein the active material of the negative electrode is an alkali metal, and the positive electrode is further comprised of a binder.

11. An electrolytic cell as in any of claims 1 or 2, wherein the active material of the negative electrode is an alkali metal, the electrolyte is non-aqueous, and the positive electrode is further comprised of a binder.

12. An electrolytic cell as in any of claims 1 or 2, wherein the active material of the negative electrode is the alkali metal lithium, and the electrolyte is non-aqueous, and the positive electrode is further comprised of a binder.

13. An electrolytic cell as in any of claims 1 or 2, wherein the active material of the negative electrode is an alkali metal, and the positive electrode is further comprised of an electrically conductive agent.

14. An electrolytic cell as in any of claims 1 or 2, wherein the active material of the negative electrode is the alkali metal lithium, and wherein the positive electrode is further comprised of an electrically conductive agent.

15. An electrolytic cell as in any of claims 1 or 2, wherein the active material of the negative electrode is the alkali metal lithium, and the electrolyte is non-aqueous, and the positive electrode is further comprised of an electrically conductive agent.

16. An electrolytic cell as in any of claims 1 or 2, wherein the active material of the negative electrode is the alkali metal lithium, and the electrolyte is non-aqueous, and the positive electrode is further comprised of a binder and an electrically conductive agent.

* * * * *